(12) United States Patent
Nishida (10) Patent No.: US 9,932,085 B2
(45) Date of Patent: Apr. 3, 2018

(54) ABS MODULATOR SUPPORT STRUCTURE OF SADDLE TYPE VEHICLE

(71) Applicant: HONDA MOTOR CO., LTD., Tokyo (JP)

(72) Inventor: Yoichi Nishida, Wako (JP)

(73) Assignee: HONDA MOTOR CO., LTD., Tokyo (JP)

(\*) Notice: Subject to any disclaimer, the term of this patent is extended or adjusted under 35 U.S.C. 154(b) by 0 days.

(21) Appl. No.: 15/457,684

(22) Filed: Mar. 13, 2017

(65) Prior Publication Data
US 2017/0267310 A1 Sep. 21, 2017

(30) Foreign Application Priority Data

Mar. 15, 2016 (JP) .................................. 2016-051652

(51) Int. Cl.
| | |
|---|---|
| B60K 11/04 | (2006.01) |
| B60R 19/52 | (2006.01) |
| B62L 1/00 | (2006.01) |
| B60T 8/40 | (2006.01) |
| B62K 11/04 | (2006.01) |
| B62L 3/02 | (2006.01) |
| B60T 8/36 | (2006.01) |
| B62K 19/38 | (2006.01) |

(52) U.S. Cl.
CPC .............. B62L 1/005 (2013.01); B60K 11/04 (2013.01); B60T 8/3685 (2013.01); B60T 8/4031 (2013.01); B62K 11/04 (2013.01); B62K 19/38 (2013.01); B62L 3/023 (2013.01)

(58) Field of Classification Search
CPC ................................ B60K 11/04; B60R 19/52
See application file for complete search history.

(56) References Cited

U.S. PATENT DOCUMENTS

| | | | |
|---|---|---|---|
| 2007/0188012 A1* | 8/2007 | Hariu ................... | B60T 8/3225 303/3 |
| 2008/0079310 A1* | 4/2008 | Yamakura ............ | B60T 8/3225 303/115.4 |

FOREIGN PATENT DOCUMENTS

JP 2008-87541 A 4/2008

\* cited by examiner

*Primary Examiner* — Bryan A Evans
(74) *Attorney, Agent, or Firm* — Birch, Stewart, Kolasch & Birch, LLP (57) ABSTRACT

An ABS modulator support structure of a saddle type vehicle includes a main frame, a down frame, a pair of shroud which cover the right and left side of the frames, a radiator, a reserve tank which stores a coolant for the radiator, and an ABS module. The radiator is arranged on one (left side) side of the down frame 18 in a width direction of the vehicle. The ABS module is arranged on the other (right side) of the sides of the down frame in the width direction of the vehicle. The reserve tank and the shrouds are arranged outside the ABS module.

12 Claims, 8 Drawing Sheets

ABS MODULATOR SUPPORT STRUCTURE
OF SADDLE TYPE VEHICLE

TECHNICAL FIELD

The present invention relates to an ABS modulator support structure of a saddle type vehicle.

BACKGROUND ART

An ABS modulator is an apparatus which controls a braking force of a brake and prevents a slipping action. However, since this apparatus has a heavy weight, this apparatus is difficult in arrangement and various kinds of layout are studied. As an example, there is a structure in which an ABS module arranged on a side of a main frame and is supported on a sub-frame (see Patent Literature 1).

CITATION LIST

Patent Document

[Patent Literature 1] Japanese Unexamined Patent Application Publication No. 2008-87541

SUMMARY OF THE INVENTION

Problem to be Solved by the Invention

By the way, a vehicle which installs a water cooling type engine includes a heat exchanger on a front part of a vehicle body so as to cool the engine by a traveling wind. However, since a hot wind is caused if the heat exchanger is provided on the vehicle, it is necessary for this hot wind to prevent from flowing onto the ABS modulator. In result, it becomes more difficult to design a layout. Accordingly, an object of the present invention is to realize a layout which can avoid a heat influence from the heat exchanger by using the frame structure and the other equipments.

Means for Solving Problem

A first aspect of the present invention is directed to an ABS modulator support structure of a saddle type vehicle comprising: a vehicle body frame (10) including a head pipe (16), a main frame (17) which extends backward from the head pipe, and a down frame (18) which extends downward from the head pipe; a power unit (11) arranged in a space enclosed by the main frame and the down frame and supported by the frames; a cooling unit including a heat exchanger (21) cooling cooling medium for cooling the power unit, and a reserve tank (60) which storing the cooling medium; an external cover including a pair of shroud (19) which cover right and left side of the down frame (18); a braking unit which applies a vehicle wheel braking force; and an ABS module (20) connected to the braking unit; wherein the heat exchanger (21) arranged on one side of the down frame (18) in a width direction of the vehicle; the ABS module (20) arranged on the other of the sides of the down frame (18); and the reserve tank (60) and the shrouds (19) arranged outside the ABS module.

A second aspect of the present invention in the first aspect of the present invention is characterized in that the ABS module (20) arranged backward from the down frame (18).

A third aspect of the present invention in the second aspect of the present invention is characterized in that the structure includes a support member supported on the main frame (17) and the down frame (18), supports the ABS module (20) which arranged adjacent to the down frame (18), and includes an ABS support member (30) which supports the reserve tank (60) at the outside in a width direction of the vehicle.

A fourth aspect of the present invention in the third aspect of the present invention is characterized in that a regulator (50) including a regulator main body (53) and cooling fins (51) arranged between the ABS module (20) and the reserve tank (60), the cooling fins (51) arranged so as to extend in a forward and backward direction, and the reserve tank (60) covers the whole of an outer side of the regulator (50) when taken in a side view.

A fifth aspect of the present invention in the fourth aspect of the present invention is characterized in that the reserve tank (60) includes a front bulged portion (65) which bulges inwardly in the width direction of the vehicle so as to cover a front side of the regulator main body (53), and a level indicator (69) which serves to confirm a level of the cooling medium is provided on the front bulged portion (65).

A sixth aspect of the present invention in the fifth aspect of the present invention is characterized in that the reserve tank (60) includes a rear bulged portion (62) which bulges inwardly in the width direction of the vehicle so as to cover a rear side of the regulator main body (53), and the reserve tank filler (64) arranged at a front side of a vehicle body from the rear bulged portion (62).

A seventh aspect of the present invention in any one of the first aspect of the present invention through the sixth aspect of the present invention is characterized in that the heat exchanger (21) is a radiator which arranged so that the width direction of the vehicle becomes smaller than the vertical direction, and the cooling medium is a cooling water.

Effect of the Invention

According to the first aspect of the present invention, since the ABS module and the radiator arranged to be separated from each other in the width direction of the vehicle and are partitioned by the down frame, it is possible to arrange the ABS module so as not to blow the traveling wind which passes the heat exchanger to the ABS module. In addition, it is possible to protect the sides of the ABS module by the reserve tank and the shrouds installed on the vehicle. Accordingly, it is possible to protect the sides of the ABS module by the reserve tank and the shrouds while eliminating a heat influence from the heat exchanger According to the second aspect of the present invention, since the ABS module arranged backward from the down frame, the ABS module can be protected by the down frame.

According to the third aspect of the present invention, since a common support member supports the ABS module support member and the reserve tank, it is possible to decrease the number of the support members and to suppress the number of parts. In addition, it is possible to protect the ABS module by the reserve tank.

According to the fourth aspect of the present invention, the regulator is an electrical equipment having a given shape. By disposing the reserve tank having a high degree of flexibility in shape in a space between the regulator and the shrouds, it is possible to suppress the reserve tank from projecting to the width direction of the vehicle while ensuring a capacity of the reserve tank.

According to the fifth aspect of the present invention, since the level indicator is provided on the front bulged portion, it is possible to confirm the level from the front side of the vehicle body. In result, by covering the regulator main body with the front bulged portion while facilitating a checking operation of the vehicle, it is possible to improve an outer appearance while protecting the regulator by the reserve tank.

Furthermore, it is possible to suppress an expansion of the shrouds in the width direction of the vehicle, although the capacity of the reserve tank is increased.

According to the sixth aspect of the present invention, since the rear bulged portion undertakes fluctuations of capacity at the rear side of the reserve tank, even if a liquid surface in the reserve tank shakes forward and backward when accelerating or braking the vehicle, and since it is possible to absorb the shaking of the liquid surface in the reverse tank, the cooling medium which flows into the filler of the reserve tank becomes a few, and it is possible to prevent a back-flow.

According to the seventh aspect of the present invention, since the radiator arranged so as to become small in the width direction of the vehicle, the side of the radiator becomes small in the width direction of the vehicle by covering the radiator with the shrouds which are formed in association with the radiator. In addition, since the sides of the ABS module are covered with the pair of right and left shrouds, the sides of the ABS module are covered with the small size shrouds, one of the sides in the width direction of the vehicle, on which the ABS module is arranged, becomes small in the width direction of the vehicle, the whole of the vehicle becomes small in the width direction of the vehicle. In result, it is possible to realize a miniaturization of the vehicle.

MODE(S) FOR CARRYING OUT THE INVENTION

Embodiments of the present invention will be described below in accordance with the drawings. In the embodiments in the drawings, the words of "front" and "rear", "left" and "right", and "upper" and "lower" are indicated with reference to a using state of a vehicle, concretely with reference to a traveling direction of the vehicle.

Figure 1:
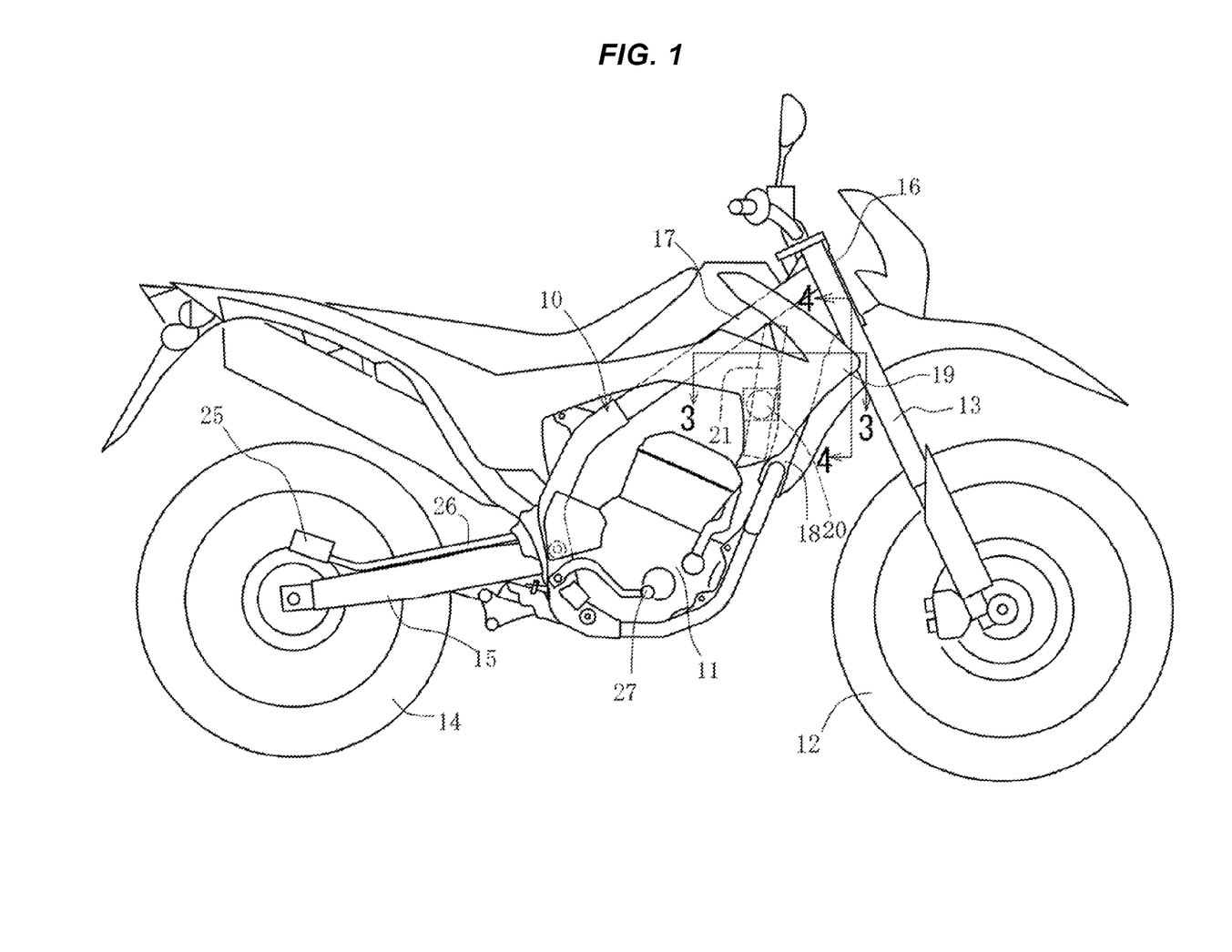
FIG. 1 is a side elevational view of a vehicle according to an embodiment of the present invention.

FIG. 1 shows a right side face of a motorcycle having an off-road specification. This motorcycle supports a water cooling engine 11 on a vehicle body frame 10, supports a front wheel 12 through a front fork 13 and supports a rear wheel 14 through a rear arm 15 at a front side and a rear side of the engine 11, respectively.

The vehicle body frame 10 includes a pair of right and left main frames 17 which descend slant from a head pipe 16 above an upper side of the engine 11 and extend backward, and a down frame 18 which descends slant from the head pipe 16 at a front side of the engine 11 and extends backward.

A pair of right and left shrouds 19 cover the main frames 17 and the down frame 18 at the vicinities of the frames 17 and 18 and above the upper side of the engine 11.

An ABS module 20 and a radiator 21 arranged above an upper portion of the engine 11 covered with the shrouds 19. In FIG. 1, a code 25 indicates a rear wheel brake. A code 26 indicates a brake pipe arrangement for the rear wheel which interconnects the ABS module 20 and the rear wheel brake 25 to each other and is arranged along the rear arm 15. A code 27 indicates a brake pedal for the rear wheel brake.

Figure 2A:
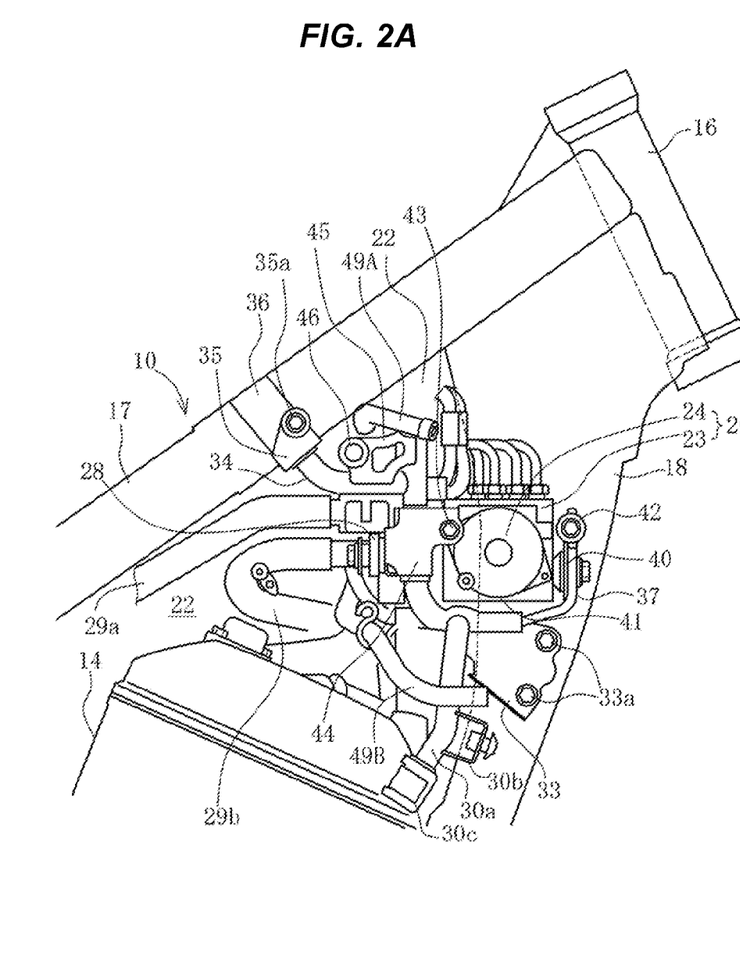
FIG. 2A is an enlarged side elevational view of a part of the vehicle shown in FIG. 1.
Figure 2B:
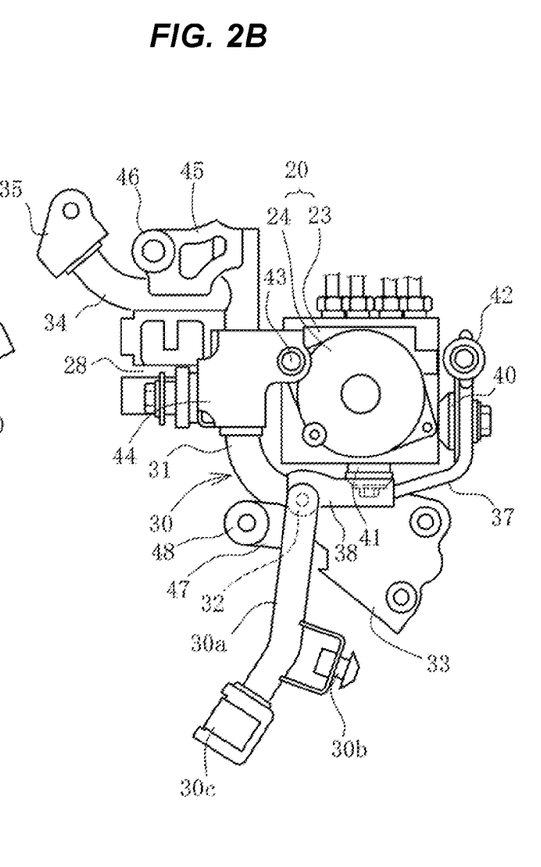
FIG. 2B is an enlarged side elevational view of a support structure of an ABS module shown in FIG. 2A.

FIG. 2A shows an enlarged view of an arrangement part of the ABS module 20 in FIG. 1 and FIG. 2B shows a support structure part of the ABS module 20 in FIG. 2A. The shrouds 19 are omitted in FIGS. 2A and 2B.

The ABS module 20 arranged in a substantially triangular space 22 defined by the head pipe 16, the main frame 17, and the down frame 18 above the upper side of the engine 11.

The ABS module 20 is a known apparatus which controls an oil pressure for an oil pressure brake in order to prevent a wheel from being locked and which has a relatively heavy weight on account of integration of an oil pressure module 23 and a motor 24.

A plurality of oil pipe arrangements are connected to an upper face of the oil pressure module 23. A part of the oil pressure pipe arrangements is connected to a brake pipe arrangement 26 for a rear wheel. When the brake pedal 27 (FIG. 1) is actuated, the part of the oil pressure arrangements actuates the rear wheel brake 25 by an oil pressure which does not lock the rear wheel.

The ABS module 20 is supported by the ABS support member supported on the vehicle body frame 10. This ABS support member includes a substantially L-shaped longitudinal main pipe 31 when taken in a side view, and a lateral main pipe 32 which extends outward from the down frame 18. The one end of the ABS support member is secured through a first bracket 33 to a side face of the down frame 18 by bolts 33 and the other end of the ABS support member secures a second bracket 35 provided on an end of a branched pipe 34 through the branched pipe 34 to a stay 36 which is provided on a side face of the main frame 17 by a bolt 35a.

A front support member 37 extends forward from the front end portion of the lateral main pipe 32 and extends and bends upward in front of the ABS module 20. Then, a front side portion of the oil pressure module 23 is supported by a rubber mount 40. For information, a bottom portion of the oil pressure module 23 is supported by a rubber mount 41 on a third bracket 38 which extends forward from the lateral main pipe 32.

Figure 3:
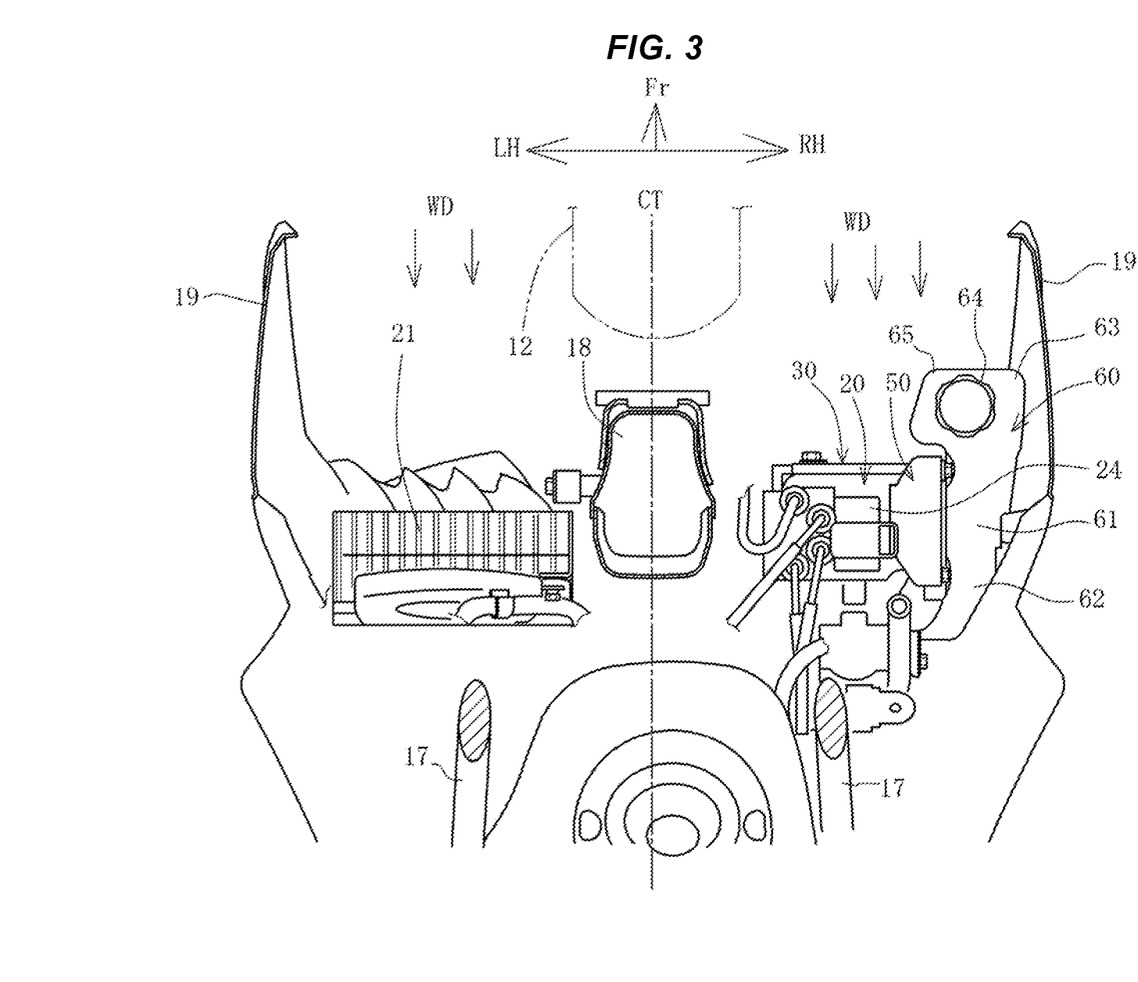
FIG. 3 is a sectional view taken along lines 3-3 in FIG. 1

For information, although it is omitted in FIGS. 2A and 2B, a regulator 50 and the reserve tank 60 are supported on the ABS support member. The front support member 37 is provided on its upper end with a nut 42 which secures an end of the regulator 50. A nut 43 which secures the other end of the regulator 50 is provided on a position across the ABS module 20 and opposed to the nut 42. The nut 43 is provided on a fourth bracket 44 which is provided on an intermediate part of a portion extending upward from the longitudinal main pipe 31 in the upward and downward direction. As shown in FIG. 3, the regulator 50 is arranged so as to be superposed on an outside of the ABS module 20 when taken in a side view.

A fifth bracket 45 is provided between an upper end portion of the longitudinal main pipe 31 which is higher than the fourth bracket 44 and the branched pipe 34. A nut portion 46, on which an upper portion of the reserve tank 60 is fixed, is provided on the fifth bracket 45. Also, a sixth bracket 47 extends backward at a position lower than the fourth bracket 44 and below the upward bending portion of the longitudinal main pipe 31 and at an end portion bent downward. A nut portion 48 which fixes a lower end of the reserve tank 60 is provided on the sixth bracket 47.

As shown in FIG. 1 and FIG. 3, the reserve tank 60 is arranged so as to be superposed on the ABS module 20 and the regulator 50 from the outside of them when taken in a side view, and the reverse tank 60 extends frontward from the ABS module 20. Codes 49A and 49B indicate pipe arrangements which interconnect the reserve tank 60 and the radiator 21 to each other.

For information, a secondary exhaust valve 28 is supported on the fourth bracket 44 at a position backward from the ABS module 20. The secondary exhaust valve 28 is an apparatus which controls an air for adjusting an exhaust gas, is arranged in a longitudinal direction, is connected to an air cleaner through a hose 29a, and is connected to an exhaust port of the engine 11 by a hose 29b, as shown in FIG. 2A.

Also, as shown in FIGS. 2A and 2B, the lateral main pipe 32 extends outward and further extends slant downward so as to define a shroud support pipe 30a. The shroud support pipe 30a is provided on its distal end with latch portions 30b and 30c which support the shrouds 19.

FIG. 3 shows a sectional view taken along lines 3-3 in FIG. 1. The radiator 21 is arranged on a left side of the down frame 18 which is arranged as a single element along a vehicle center line CT. Although the radiator 21 is arranged on only a left side of a vehicle body and has a relatively narrow lateral width, the radiator 21 is arranged in a longitudinal direction (see FIGS. 4A and 4B). For information, in FIG. 3, a front side is indicated by an arrow FR, and a right side is indicated by an arrow RH, and a left side is indicated by an arrow LH.

The outside of the radiator 21 is covered with the shrouds 19. The shrouds 19 extend forward, define a space which is open in a front side, and introduce a cooling wind (a traveling wind) WD into the shrouds 19.

The ABS module 20, the regulator 50, and the reserve tank 60 are arranged on the right side of the down frame 18 so as to be superposed on each other in a side direction. The ABS module 20 and the regulator 50 are arranged on both sides of the down frame 18 so as to be substantially superposed on the radiator 21. The ABS module 20 arranges the motor 24, which has a substantially rectangular shape when taken in a plan view (a substantially circular shape when taken in a side view, see FIGS. 2A and 2B), on the outside of the oil pressure module 23. The outside face of the motor 24 is formed into a flat face. The regulator 50 is arranged on the flat face of the motor 24 so as to oppose the fins to the flat face.

The reserve tank 60 is arranged between the regulator 50 and the shrouds 19. An intermediate portion 61 of the reserve tank 60 which is superposed on the regulator 50 and a rear portion 62 of the reserve tank 60 at the backward from the regulator 50 have thin thicknesses. Also, a front portion 63 of the reserve tank 60 extends forward from the regulator 50. A part of the front portion overhangs forward so as to be superposed on the regulator 50 and is formed into a large volume. The front portion 63 is provided on its upper face with a cap 64. A cooling wind (a traveling wind) WD is also introduced onto the regulator 50 and the reserve tank 60. This will be describe below in detail.

Figure 4A:
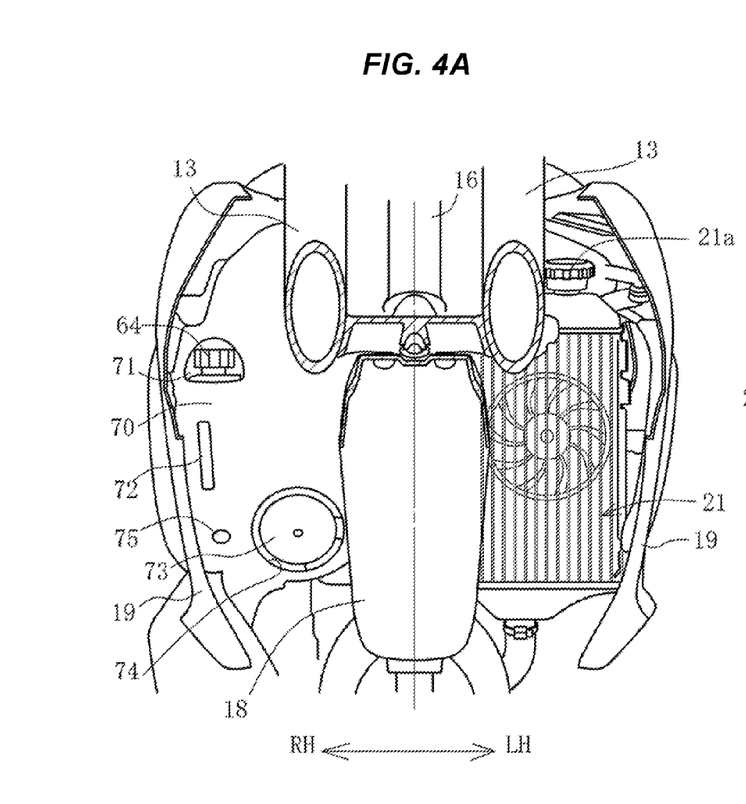
FIG. 4A is a sectional view taken along lines 4-4 in FIG. 1, illustrating a state in which a front side of the ABS module is covered with a cover.
Figure 4B:
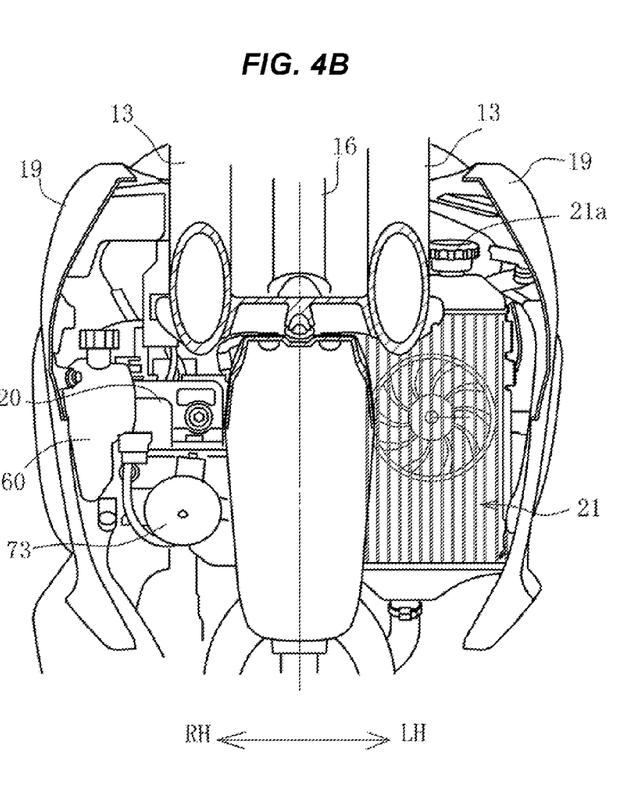
FIG. 4B is a sectional view taken along lines 4-4 in FIG. 1, illustrating a state in which the cover is removed from a front side of the ABS module.

FIG. 4A is a sectional view taken along lines 4-4 in FIG. 1, illustrating a state in which front sides of the ABS module 20 and the like are covered with a cover 70. FIG. 4B is a sectional view taken along lines 4-4 in FIG. 1, illustrating a state in which the cover 70 is removed from a front side of the ABS module 20. As shown in FIG. 4A, the cover 70 covers a front part of a space in the right side of the vehicle body. However, the cover 70 is provided with a window 71 opposed to the cap 64, a liquid amount window 72 (described later) for seeing a liquid amount in the reserve tank 60, a horn opening 74 opposed to a horn 73, and the like. A code 75 is a bolt for fixing the cover 70 on a latch portion 30b (FIGS. 2A and 2B) of the shroud support pipe 30a.

Figure 5:
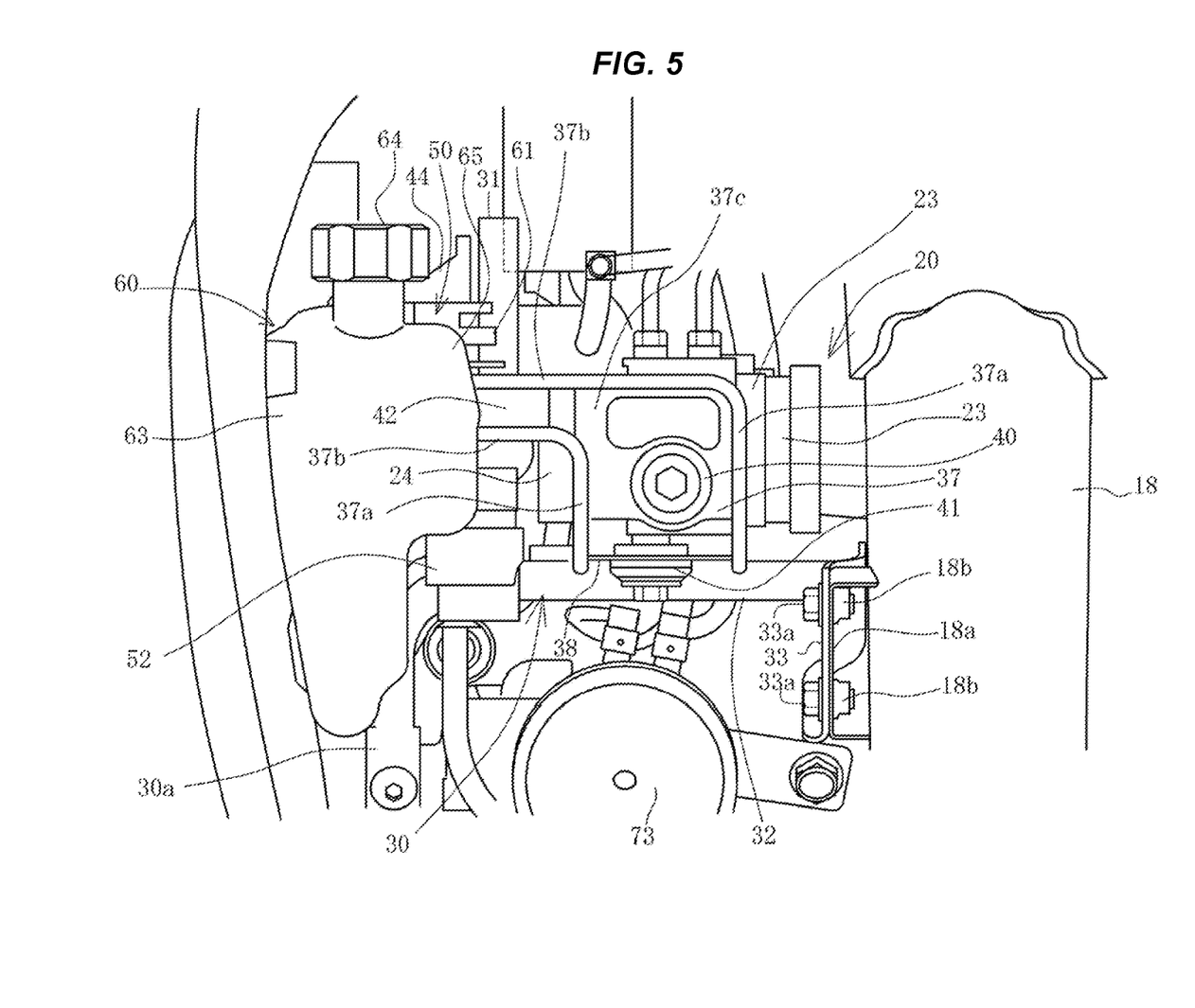
FIG. 5 is an enlarged view of a part of FIG. 4B.
Figure 6:
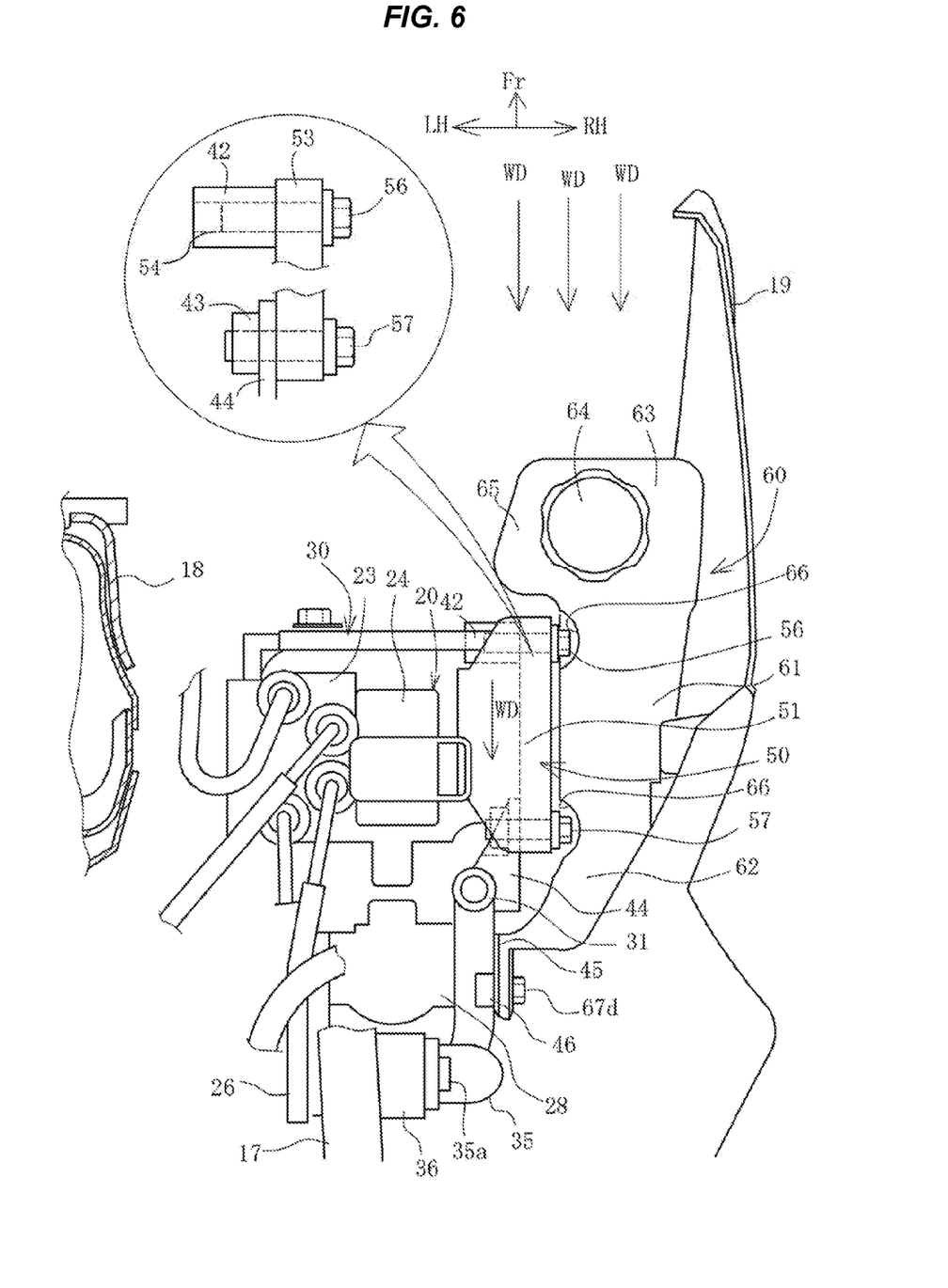
FIG. 6 is an enlarged view of a part of FIG. 3.

For information, the radiator 21 is arranged inside the shrouds 19 on the left side of the vehicle body so as to extend in the longitudinal direction. As shown in FIG. 4B, when the cover 70 is removed, the ABS module 20, the regulator 50 (FIG. 5) and the reserve tank 60 appear in sight. An arrangement of these elements will be described below in detail. Hereinafter, an arrangement structure concerning the ABS module 20, the regulator 50, and the reserve tank 60 will be described below in detail in accordance with FIG. 5, FIG. 6 and the like. FIG. 5 is an enlarged view of a part of FIG. 4B and FIG. 6 is an enlarged view of a part of FIG. 3.

In FIG. 5, an end of the lateral main pipe 32 is integrated with a first bracket 33, and the first bracket 33 is secured to the nut 18b of the stay 18a by means of the bolt 33a, which is provided on the side face of the down frame 18.

A pair of elongated sub-pipes 37a, which are spaced away from each other in the width direction of the vehicle, extend forward from the lateral main pipe 32, and then bend upward, and further distal ends of the sub-pipes 37a bend outward in a lateral direction so as to define a pair of laterally-directed portions 37b. The pair of laterally-directed portions 37b are separated away from each other in the upward and downward direction, and integrate the nut 42 between them. A plate 37c is welded between the pair of sub-pipes 37a and a rubber mount 40 is attached to the plate 37c.

As shown in FIG. 5, the reserve tank 60 has a large volume portion on an upper part of the front side 63 and a part of the reserve tank 60 defines an overhang portion 65 which extends inward in the vehicle body so as to cover the front part of the regulator 50. A code 52 in FIG. 5 indicates a connector for the regulator 50. The overhang portion 65 is positioned forward from the connector 52.

As shown in FIG. 6, the reserve tank 60 is formed into a complex shape so as to fill a space between the shrouds 19 and the regulator 50. The complex shape has long sizes in the forward and backward direction and in the upward and downward direction and has a thin thickness except the front side 63. Such complex shape can be formed by making the reserve tank 60 from a resin material. A rear side 62 also extends slightly inside the vehicle body at the rear side of the regulator 50 so as to define a rear bulged portion. However, an intermediate portion 61 is in parallel with a main body 53 by descending a surface of the vehicle inside to a position lower than the front side 63 and the rear side 62 in an outward direction. The intermediate portion 61 is provided on its inside face with a concave portion 66 for containing heads of the bolts 56 and 57.

Figure 7A:
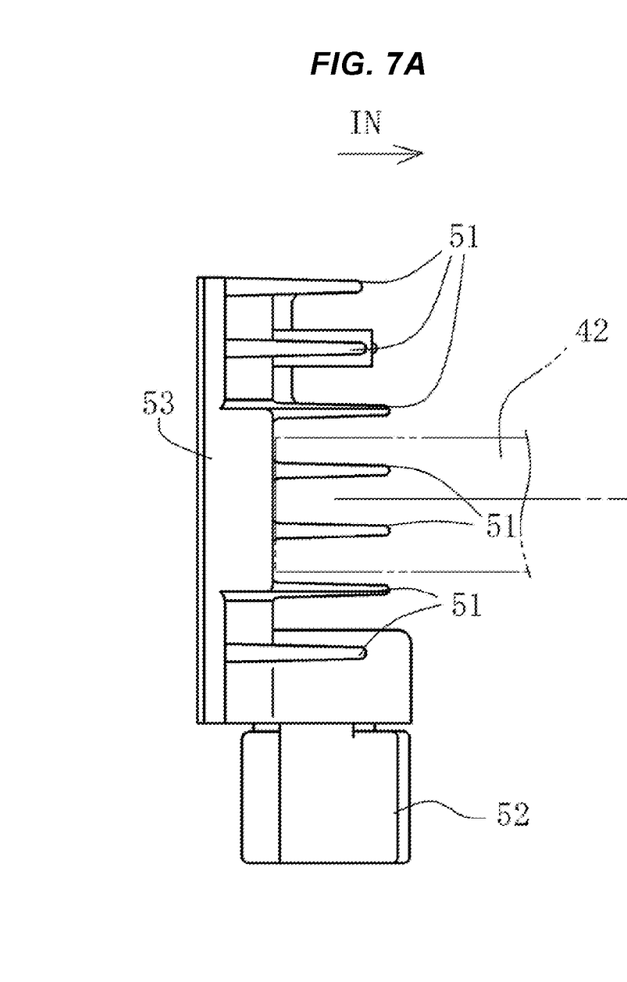
FIG. 7A is a front elevational view of a regulator, illustrating a state taken from an inside of a vehicle body.
Figure 7B:
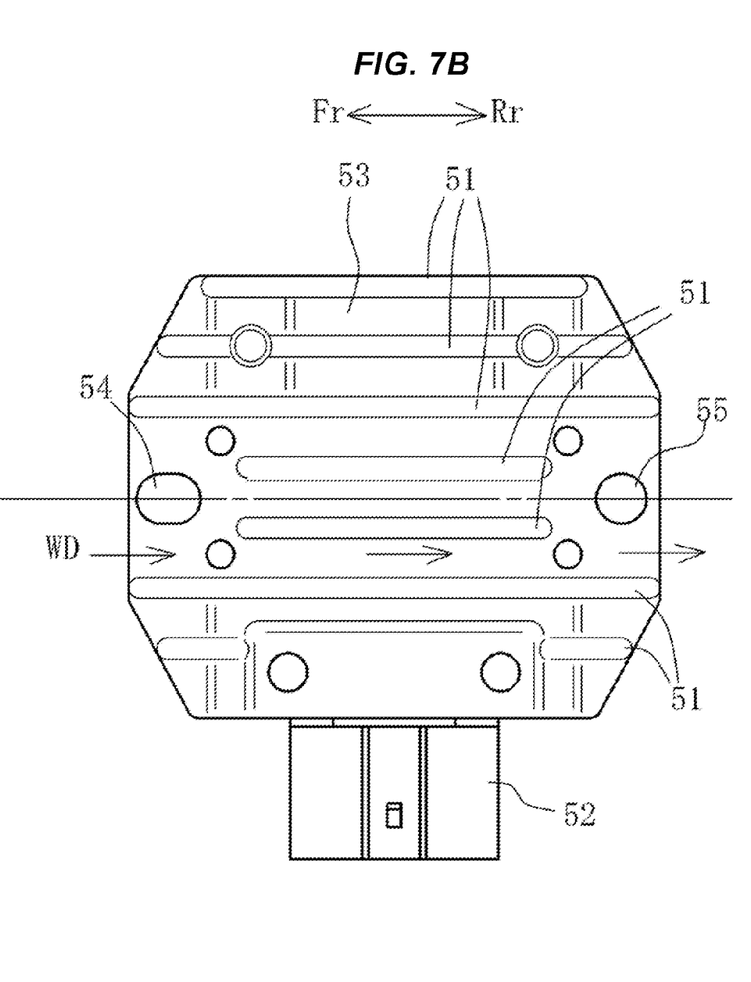
FIG. 7B is a side elevational view of the regulator.

FIG. 7A shows a front elevational view (when taken from a vehicle body inside) of the regulator 50 and FIG. 7B shows a side elevational view of the regulator 50. As shown in FIGS. 7A and 7B, a main body 53 is formed into a substantially hexagonal shape when taken in the front elevational view. A plurality of fins 51 are provided in parallel with each other on a surface of the main body 53. The fins 51 extend in an inward direction of the vehicle body (in a direction shown by an arrow IN in FIG. 7B toward the motor 24 and is arranged so as to direct the longitudinal direction of the fins 51 toward the frontward and backward direction. Such arrangement can smoothly flow the cooling wind (the traveling wind) WD along the fins 51 from the front side to the rear side.

The main body 53 is provided on its ends in the forward and backward direction with bolt-through holes 54 and 55 for use of bolt-attachment. Nuts 42 (43) are attached to the bolt-through holes 54 (55), and the nuts are attached to the ABS support portion by the bolts 56 and 57 (FIG. 6).

As shown in the enlarged view in FIG. 6, the bolt-through hole 54 is secured to the nut 42 by the bolt 56. Then, since the nut 42 is formed into a circular cylinder, the nut 42 fastens the bolt 56 from the outside of the vehicle body while an end face of the nut is contacting with the surface of the main body 53. The bolt-through hole 55 operates same as the case with the bolt-through hole 54. The main body 53 is brought into contact with the fourth bracket 44, and the bolt 57 is secured from the outside of the vehicle body to the nut 43 which is provided on the inside of the vehicle body.

The regulator 50 is formed into a substantially trapezoidal shape when taken in a plan view in FIG. 6. The fins 51 extend substantially in parallel with the flat face of the motor 24. Also, the overhang portion 65 is superposed on the main body 53, but the overhang portion 65 extends so that the portion 65 is not superposed on the front portions of the fins 51, thereby not limiting a flow of the cooling wind to the fins 51.

Figure 8A:
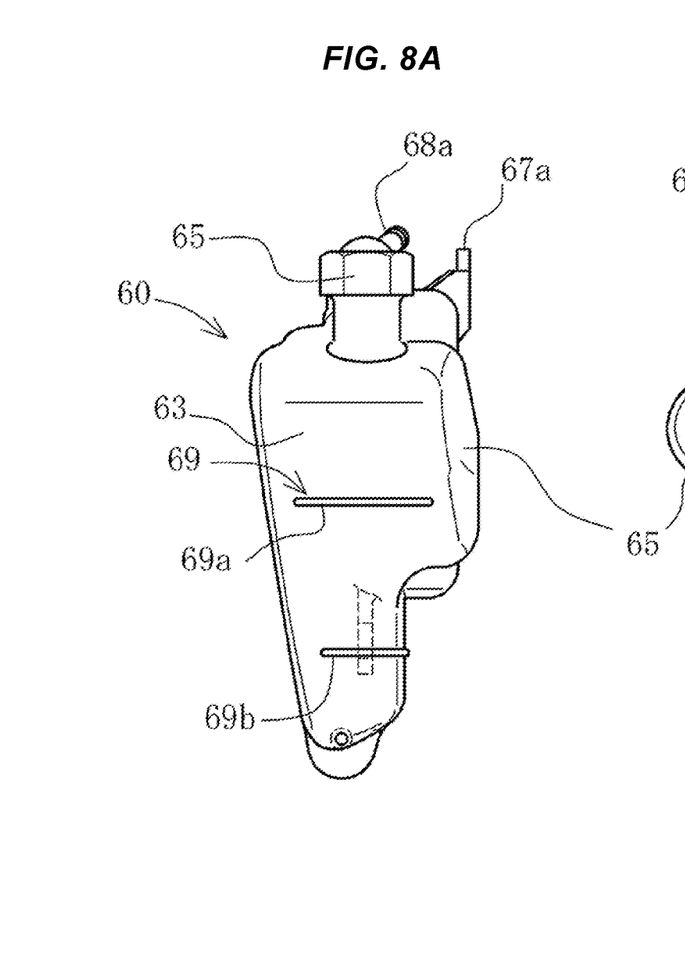
FIG. 8A is a front elevational view of the reserve tank, illustrating a state taken from an inside of the vehicle.
Figure 8B:
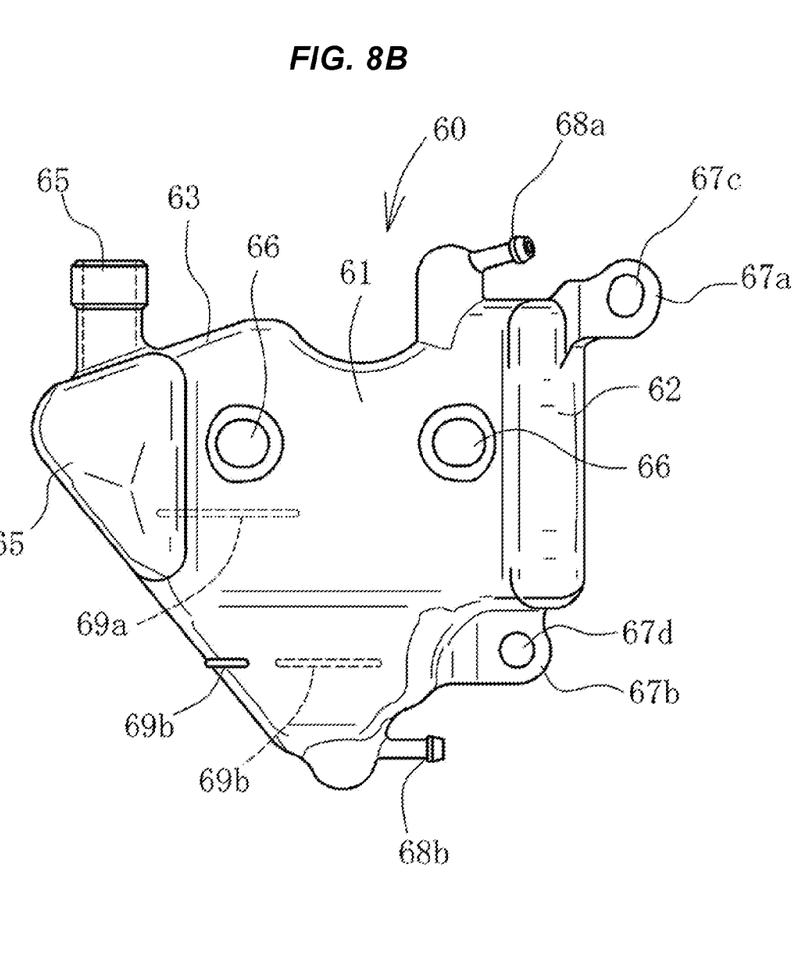
FIG. 8B is a side elevational view of the reserve tank shown in FIG. 8A.

FIG. 8A shows a front elevational view of the reserve tank 60 when taken from the inside direction of the vehicle body, and FIG. 8B shows a side view of the reserve tank 60. Attachment portions 67a and 67b are integrated with the vertical portions on the rear side 62 of the reserve tank 60. The respective attachment portions 67a and 67b are superposed on the fifth bracket 45 and the sixth bracket 47 (FIGS. 2A and 2B). After the respective attachment holes 67c and 67d are accorded with the nuts 46 and 48, the attachment portions are secured to the attachment holes by the bolt 67d (FIG. 6).

The rear portion 62 is provided on its upper part with a return side joint 68a which projects upward. A hose 49a (FIG. 2A) is connected to the joint 68a. The joint 68a is connected near the cap 21a (FIGS. 4A and 4B) of the radiator 21 and serves as a connecting part for returning a cooling water, which overflows from the radiator 21, to the reserve tank 60. In particular, as shown in FIG. 8B, the rear portion 62 provides a tank capacity backward from the end part of the joint 68a so as to define a thickness in the width direction. Thus, the rear portion 62 serves to receive the cooling water when the cooling water sways forward and backward, and it is possible to prevent the cooling water from causing a back-flow from the joint 68a.

The reserve tank 60 is provided on the lowest part of an intermediate portion 61 with a supply side joint 68b which projects from the lowest part. A hose 49b (FIG. 2A) is connected to the supply side joint 68b. As shown in FIG. 8A, the front portion 63 is provided on its front face with a level indicator 69. The level indicator 69 provided on a front face of the reserve tank 60 serves to linearly indicate a liquid amount. Code 69a indicates an upper limit line. Code 69b indicates a lower limit line and is provided near a lower joint 68b. The respective limit lines extend in the horizontal direction and are provided with projections and depressions. The front side level indicator 69 can be viewed from a liquid amount window 72 (see FIG. 4A). For information, the level indicator 69 is also provided on an outer side out of the side faces of the reserve tank 60 (see FIG. 8A).

Thus, since the level indicator 69 is formed on a wide area, it is possible to enhance a viewable performance. The side level indicator 69 can be seen when the shrouds 19 are removed.

Next, an operation in the embodiments will be described below.

As shown in FIG. 3, since the ABS module 20 and the radiator 21 are arranged to be separated from each other in the width direction of the vehicle and are partitioned by the down frame 18, it is possible to arrange the ABS module 20 so as not to blow the traveling wind which passes the radiator 21 to the ABS module. In addition, it is possible to protect the sides of the ABS module 20 by the reserve tank 60 and the shrouds 19 installed on the vehicle. Accordingly, it is possible to protect the sides of the ABS module 20 by the reserve tank 60 and the shrouds 19 while eliminating a heat influence from the radiator 21.

Since the ABS module 20 is arranged backward from the down frame 18, when some member moves toward the ABS module 20 from an outside front direction, the down frame 18 can block the member. In result, the ABS module 20 can be protected by the down frame 18.

As shown in FIG. 2A, FIG. 2B, and FIG. 6, since the ABS module support member 30 supports the reserve tank 60 and the ABS module 20 together, it is possible to decrease the number of the support members and to suppress the number of parts. In addition, it is possible to protect the ABS module 20 by the reserve tank 60.

As shown in FIG. 6, the regulator 50 is an electrical equipment having a given shape and is a member having a low degree of flexibility in shape. On the other hand, the reserve tank 60 has a high degree of flexibility in shape and can fills a clearance. Therefore, by disposing the reserve tank 60 having the high degree of flexibility in shape in a space between the regulator 50 and the shrouds 19, it is possible to suppress the reserve tank 60 from projecting to the width direction of the vehicle while ensuring a capacity of the reserve tank 60.

As shown in FIG. 8A, since the level indicator 69 is provided on the overhang portion 65 which is a front part bulged portion, it is possible to confirm the level from the front side of the vehicle body. In result, by covering the regulator main body 53 with the overhang portion 65 while facilitating a checking operation of the vehicle, it is possible to improve an outer appearance while protecting the regulator 50 by the reserve tank 60. Furthermore, it is possible to suppress an expansion of the shrouds 19 in the width direction of the vehicle, although the capacity of the reserve tank 60 is increased.

As shown in FIG. 8B, since the reserve tank 60 arranges the rear part 62 which is the rear bulged part on a backward position from the return side joint 68a (filler), the rear part 62 undertakes fluctuations of capacity in the rear side of the reserve tank 60, even if a liquid surface in the reserve tank 60 shakes forward and backward when accelerating or braking the vehicle, and it is possible to absorb the shaking of the liquid surface in the reverse tank. Thus, the cooling medium which flows into the joint 68a of the reserve tank 60 becomes a few, and it is possible to prevent a back-flow.

As shown in FIGS. 4A and 4B, since the radiator 21 is formed into an elongated shape so as to become small in the width direction of the vehicle, the side of the radiator 21 becomes small in the width direction of the vehicle by covering the radiator 21 with the shrouds 19 which is formed in association with the radiator 21. In addition, since the sides of the ABS module 20 are covered with the pair of right and left shrouds 19, the sides of the ABS module 20 are covered with a small shroud 19, one (a right side in this example) of the sides in the width direction of the vehicle, on which the ABS module 20 is arranged, becomes small in the width direction of the vehicle, the whole of the vehicle becomes small in the width direction of the vehicle. In result, it is possible to realize a miniaturization of the vehicle.

EXPLANATIONS OF LETTERS OR NUMERALS 17 main frame
18 down frame
19 shrouds
20 ABS module
21 radiator
30 ABS support member
50 regulator
51 fins
53 regulator main body
60 reserve tank

The invention claimed is:

1. An ABS modulator support structure of a saddle type vehicle comprising:
   a vehicle body frame including a head pipe, a main frame which extends backward from the head pipe and a down frame which extends downward from the head pipe;
   a power unit arranged in a space enclosed by the main frame and the down frame and supported by these frames;
   a cooling unit including a heat exchanger cooling a cooling medium for cooling the power unit and a reserve tank which storing the cooling medium;
   an external cover including a pair of shroud which cover right and left side of the down frame;
   a braking unit which applies a vehicle wheel braking force; and
   the ABS module connected to the braking unit;
   wherein the heat exchanger arranged on one side of the down frame in a width direction of the vehicle; and
   wherein the ABS module arranged on the other side of the down frame and
   the reserve tank and the shroud arranged outside of the ABS module.

2. The ABS modulator support structure of the saddle type vehicle according to claim 1, wherein the ABS module is arranged backward from the down frame.

3. The ABS modulator support structure of the saddle type vehicle according to claim 2, wherein an ABS support member supported on the main frame and the down frame, and the ABS support member supporting the ABS module which arranged adjacent to the down frame and supporting the reserve tank at the outside of the ABS module in the width direction of the vehicle.

4. The ABS modulator support structure of the saddle type vehicle according to claim 3, wherein a regulator including a regulator main body and cooling fins arranged between the ABS module and the reserve tank, the cooling fins formed so as to extend in a forward and backward direction, and the reserve tank covers the whole of an outer side of the regulator in a side view.

5. The ABS modulator support structure of the saddle type vehicle according to claim 4, wherein the reserve tank including a front bulged portion which bulges inwardly in the width direction of the vehicle so as to cover a front side of the regulator main body, and a level indicator which indicating to confirm a level of the cooling medium is provided on the front bulged portion.

6. The ABS modulator support structure of the saddle type vehicle according to claim 5, wherein the reserve tank including a rear bulged portion which bulges inwardly in the width direction of the vehicle so as to cover a rear side of the regulator main body, and a reserve tank filler arranged in front of the rear bulged portion.

7. The ABS modulator support structure of the saddle type vehicle according to claim 1, wherein the heat exchanger is a radiator which mounted on the vehicle such as a width direction being smaller than a vertical direction, and the cooling medium is cooling water.

8. The ABS modulator support structure of the saddle type vehicle according to claim 2, wherein the heat exchanger is a radiator which mounted on the vehicle such as a width direction being smaller than a vertical direction, and the cooling medium is cooling water.

9. The ABS modulator support structure of the saddle type vehicle according to claim 3, wherein the heat exchanger is a radiator which mounted on the vehicle such as a width direction being smaller than a vertical direction, and the cooling medium is cooling water.

10. The ABS modulator support structure of the saddle type vehicle according to claim 4, wherein the heat exchanger is a radiator which mounted on the vehicle such as a width direction being smaller than a vertical direction, and the cooling medium is cooling water.

11. The ABS modulator support structure of the saddle type vehicle according to claim 5, wherein the heat exchanger is a radiator which mounted on the vehicle such as a width direction being smaller than a vertical direction, and the cooling medium is cooling water.

12. The ABS modulator support structure of the saddle type vehicle according to claim 6, wherein the heat exchanger is a radiator which mounted on the vehicle such as a width direction being smaller than a vertical direction, and the cooling medium is cooling water.

* * * * *